United States Patent
Iwamoto

(12)
(10) Patent No.: US 6,249,650 B1
(45) Date of Patent: Jun. 19, 2001

(54) SINGLE-LENS REFLEX CAMERA

(75) Inventor: Shigeru Iwamoto, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,463

(22) Filed: Nov. 18, 1999

(30) Foreign Application Priority Data

Nov. 20, 1998 (JP) .................................................. 10-330581

(51) Int. Cl.⁷ ............................ G03B 7/099; G03B 17/20
(52) U.S. Cl. ......................... 396/271; 396/273; 396/287; 396/296
(58) Field of Search ................................. 396/271, 273, 396/268, 272, 287, 281, 296

(56) References Cited

U.S. PATENT DOCUMENTS

| Re. 35,196 | 4/1996 | Iwamoto et al. ...................... | 396/159 |
|---|---|---|---|
| 3,842,424 * | 10/1974 | Tsunekawa et al. .................. | 396/273 |
| 3,864,699 | 2/1975 | Tsunekawa et al. .................. | 396/271 |
| 4,097,876 | 6/1978 | Uno et al. ............................. | 396/272 |
| 4,322,142 | 3/1982 | Kawamura et al. .................. | 396/100 |
| 4,364,651 * | 12/1982 | Hiraike ................................. | 396/273 |
| 4,458,997 * | 7/1984 | Aratame et al. ...................... | 396/268 |
| 4,905,035 | 2/1990 | Takagi .................................. | 396/234 |
| 5,021,818 | 6/1991 | Satoh et al. .......................... | 396/234 |
| 5,138,361 | 8/1992 | Iwamoto et al. ..................... | 396/159 |
| 5,289,225 | 2/1994 | Hirai .................................... | 396/122 |
| 5,381,208 | 1/1995 | Takagi .................................. | 396/121 |
| 5,508,779 | 4/1996 | Satoh et al. .......................... | 396/222 |
| 5,713,053 | 1/1998 | Hirai .................................... | 396/92 |

* cited by examiner

Primary Examiner—W. B. Perkey
(74) Attorney, Agent, or Firm—Greenblum & Bernstein P.L.C.

(57) ABSTRACT

A single-lens reflex camera comprises a quick return mirror which can be positioned at an object observing position (or an inclined position) and a photographing position (or a horizontal position). A photoreceptor element is disposed in such a manner that a light receiving surface of the photoreceptor element faces a shutter, so that a light beam reflected by the shutter is led to the photoreceptor element. When the quick return mirror is retreated to the photographing position, the light beam is received by the photoreceptor element. When a change in the amount of received light by the photoreceptor element exceeds a predetermined range while the mirror is retreated to the photographing position before the shutter release operation, a warning is output.

10 Claims, 9 Drawing Sheets

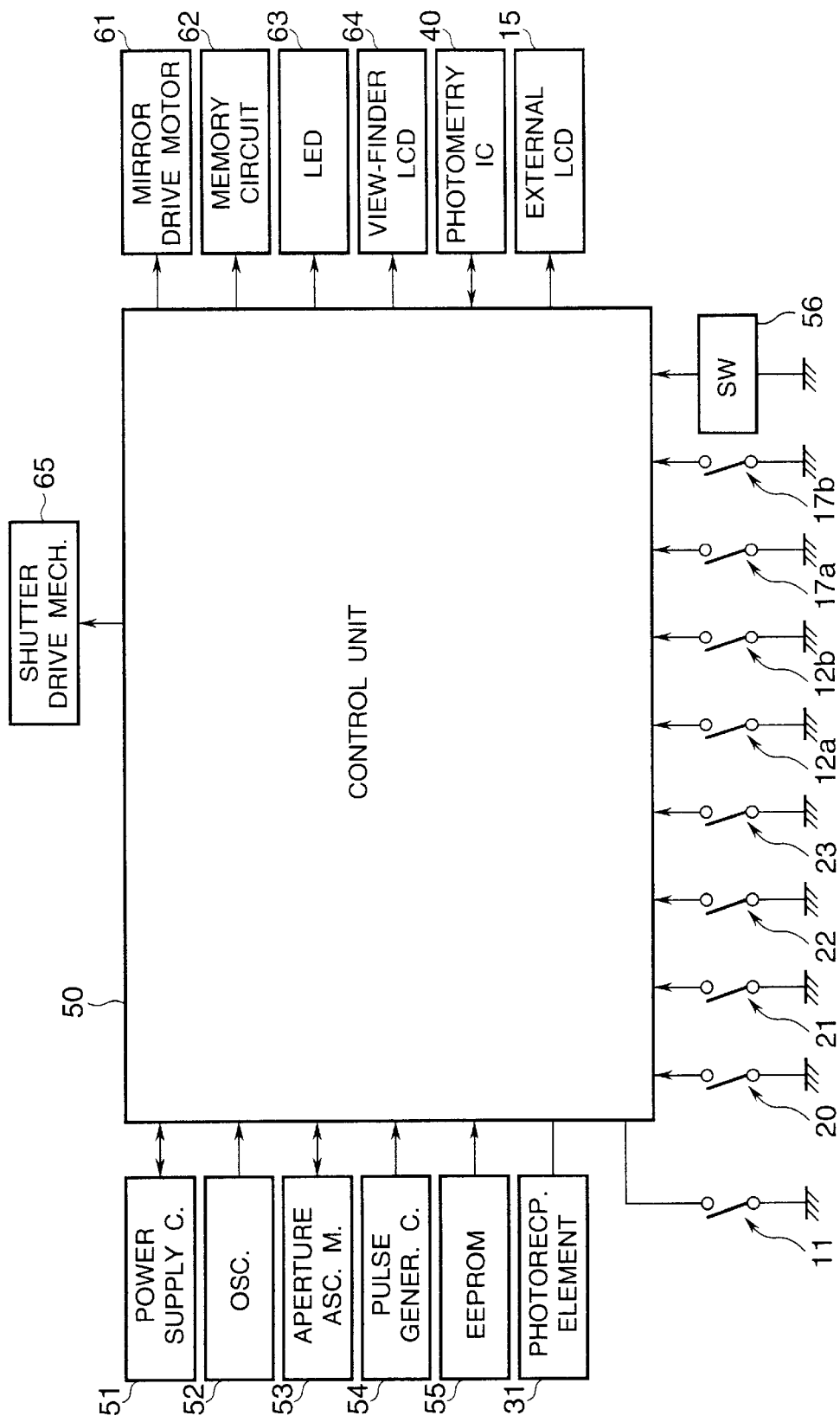

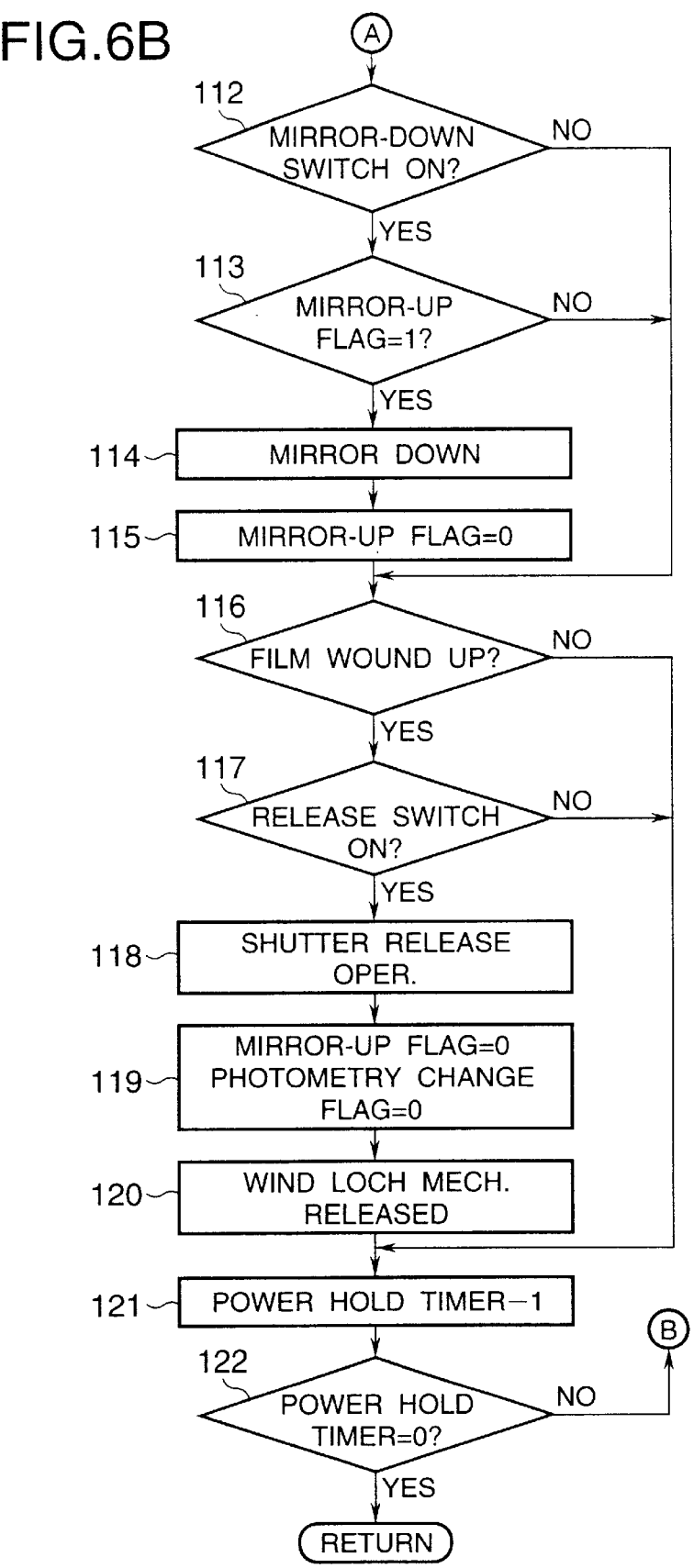

SINGLE-LENS REFLEX CAMERA

BACKGROUND OF THE INVENTION

1. Field of the Invention

The present invention relates to a single-lens reflex camera in which a mirror can be retreated before a shutter is released.

2. Description of the Related Art

Conventionally, there is known a single-lens reflex camera, in which a mirror can be moved between an object observing position for observing an object through a view-finder and a photographing position for taking a picture of the object. When the mirror is set at the object observing position, the mirror is inclined so that a luminous flux passing through a photographing optical system is reflected by the mirror and led to the view-finder. When a shutter release is carried out, the mirror is rotated from the object observing position and retreated to the photographing position, in which the mirror is horizontally positioned. When the photographing operation is completed, the mirror is returned to the object observing position.

In the single-lens reflex camera, a photometry element is provided in an optical path of the view-finder in such a manner that a luminous flux, which is reflected by the mirror which is positioned at the object observing position, is led to the photometry element. A photometry value of the object is sensed, and based on the photometry value, a shutter speed and an aperture value are controlled so that a photographing operation is performed.

In a medium-size camera in which a film having a large photographing area, such as Browny film, is mounted, the mirror is large in proportion to the photographing area. Therefore, in a shutter release operation, a shock, caused by a movement and a stoppage when the mirror is rotated from the object observing position to the photographing position, may cause a bad influence on a photographed image. In order to prevent this influence, the camera is constructed in such a manner that the mirror can be retreated to the photographing position before the shutter release operation.

However, when the mirror is retreated to the photographing position before the shutter release operation, a photometry value of the object cannot be sensed by the photometry element provided in the optical path of the view-finder optical system. Therefore, a photographing operation must be carried out utilizing the photometry value of the object, sensed immediately before the mirror was retreated, with a shutter speed and an aperture value based on the photometry value. Therefore, if a significant change of a luminance of the object occurs after the mirror is retreated, the photographing operation cannot be properly performed.

SUMMARY OF THE INVENTION

Therefore, an object of the present invention is to provide a single-lens reflex camera, in which, even if a luminance of the object is significantly changed while the mirror is retreated before a photographing operation, an improper photographing operation is prevented.

According to the present invention, there is provided a single-lens reflex camera comprising a mirror, a photometry element, a photoreceptor element, a mirror retreat mechanism and a warning processor.

The mirror is movable between an object observing position, at which a luminous flux passing through a photographing optical system is reflected by the mirror and led to a view-finder optical system, and a photographing position, at which the luminous flux is not reflected by the mirror. The photometry element is provided in an optical path of the view-finder optical system in such a manner that the luminous flux, which is reflected by the mirror at the object observing position, is led to the photometry element. The photoreceptor element has a light receiving surface which faces a shutter, so that a light beam, passing through the photographing optical system and being reflected by a shutter, enters the light receiving surface. The mirror retreat mechanism is provided for retreating the mirror to the photographing position before a shutter release operation in which the shutter opens and closes. The warning processor outputs a warning when a change in the amount of light received by the photoreceptor element exceeds a predetermined range while the mirror is retreated to the photographing position before the shutter release operation. The warning signifies that the change exceeds the predetermined range.

The single-lens reflex camera may further comprise a photometry value storing processor that stores a photometry value of an object to be photographed, the photometry value being obtained by the photometry element before the mirror is retreated by the mirror retreat mechanism. Due to this construction, it is easy for the camera to check if the change exceeds the predetermined range.

Preferably, the warning processor comprises a display, which indicates a first condition mark signifying that the mirror is retreated to the photographing position. In this case, the display may be provided in the view-finder optical system. The display may comprise a liquid crystal display provided on a camera body of the single-lens reflex camera. The first condition mark also signifies that the photometry value, obtained by the photometry element before the mirror is retreated to the photographing position, has been stored in the photometry value processor.

Preferably, the display indicates a second condition mark signifying that the change exceeds the predetermined range after the mirror is retreated by the mirror retreat mechanism. In this case, the single-lens reflex camera may further comprise a comparing processor that repeatedly checks the change. The first condition mark may be a predetermined mark that is lit, and the second condition mark may be the predetermined mark that is flashed.

The single-lens reflex camera may further comprise a mirror control switch for compulsorily moving the mirror from the photographing position when the mirror is retreated to the photographing position.

Further, according to the present invention there is provided a single-lens reflex camera comprising a mirror, a photometry element, a shutter, a photoreceptor element, a mirror retreat mechanism and a photometry value storing processor.

The mirror is movable between an object observing position, at which a luminous flux passing through a photographing optical system is reflected by the mirror and led to a view-finder optical system, and a photographing position, at which the luminous flux is not reflected by the mirror. The photometry element is provided in an optical path of the view-finder optical system in such a manner that the luminous flux, which is reflected by the mirror at the object observing position, is led to the photometry element. The shutter is provided opposite to the photographing optical system with respect to the mirror. The photoreceptor element has a light receiving surface which faces the shutter, so that a light beam, passing through the photographing optical system and being reflected by the shutter, enters the light receiving surface. The mirror retreat mechanism is provided for retreating the mirror to the photographing position before a shutter release operation in which the shutter opens and closes. The photometry value storing processor stores a photometry value of an object to be photographed, the photometry value being obtained by the photometry element before the mirror is retreated by the mirror retreat mechanism.

BRIEF DESCRIPTION OF THE DRAWINGS

The objects and advantages of the present invention will be better understood from the following description, with reference to the accompanying drawings in which:

FIG. 5 is a block diagram showing electric circuits of the camera;

FIGS. 6A and 6B are a flowchart of a photographing operation control routine, by which a photographing operation of the camera is controlled;

DESCRIPTION OF THE PREFERRED EMBODIMENTS

Figure 1:
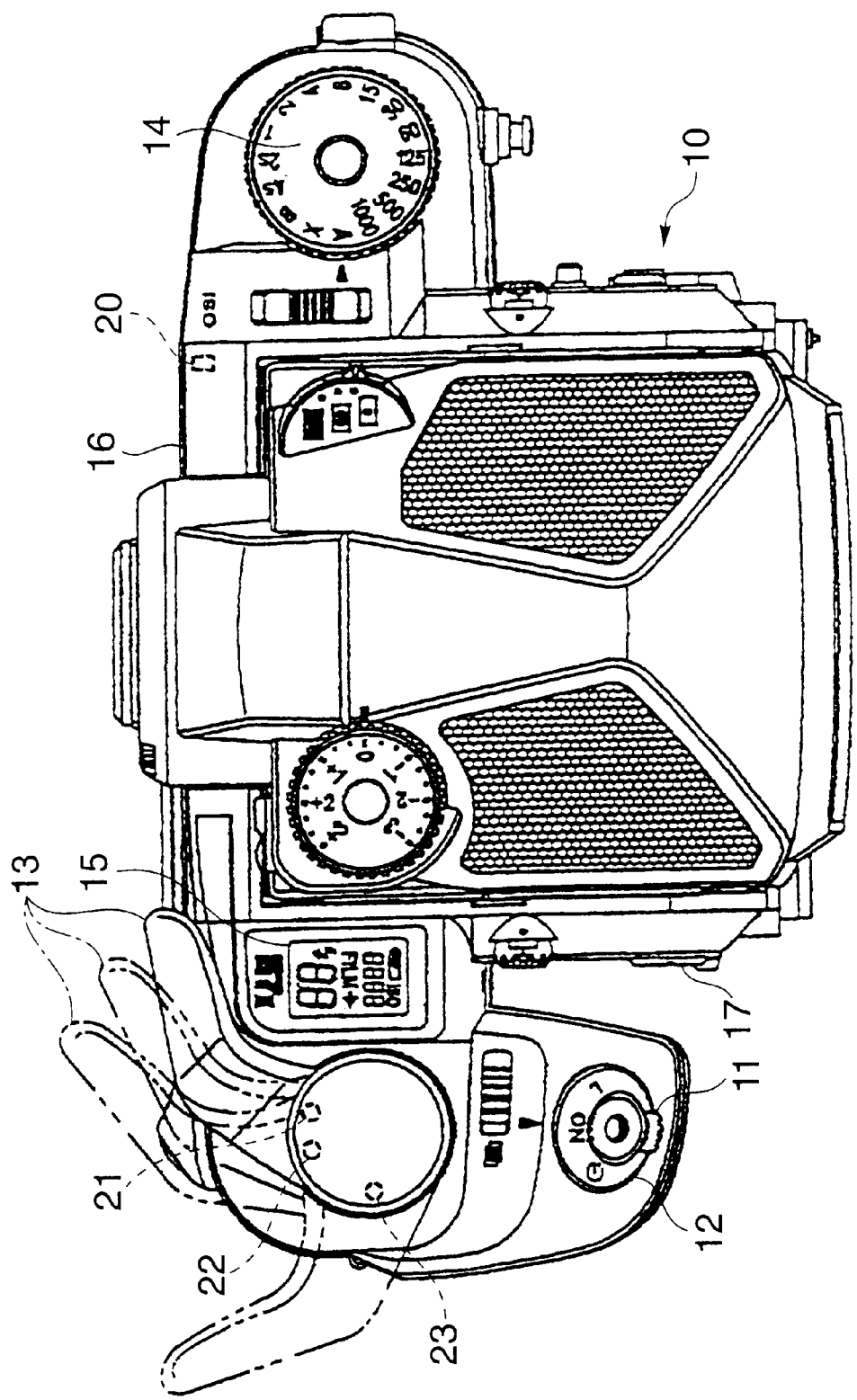
FIG. 1 is a plan view showing a single-lens reflex camera to which an embodiment of the present invention is applied.

The present invention will be described below with reference to embodiments shown in the drawings.

Figure 2:
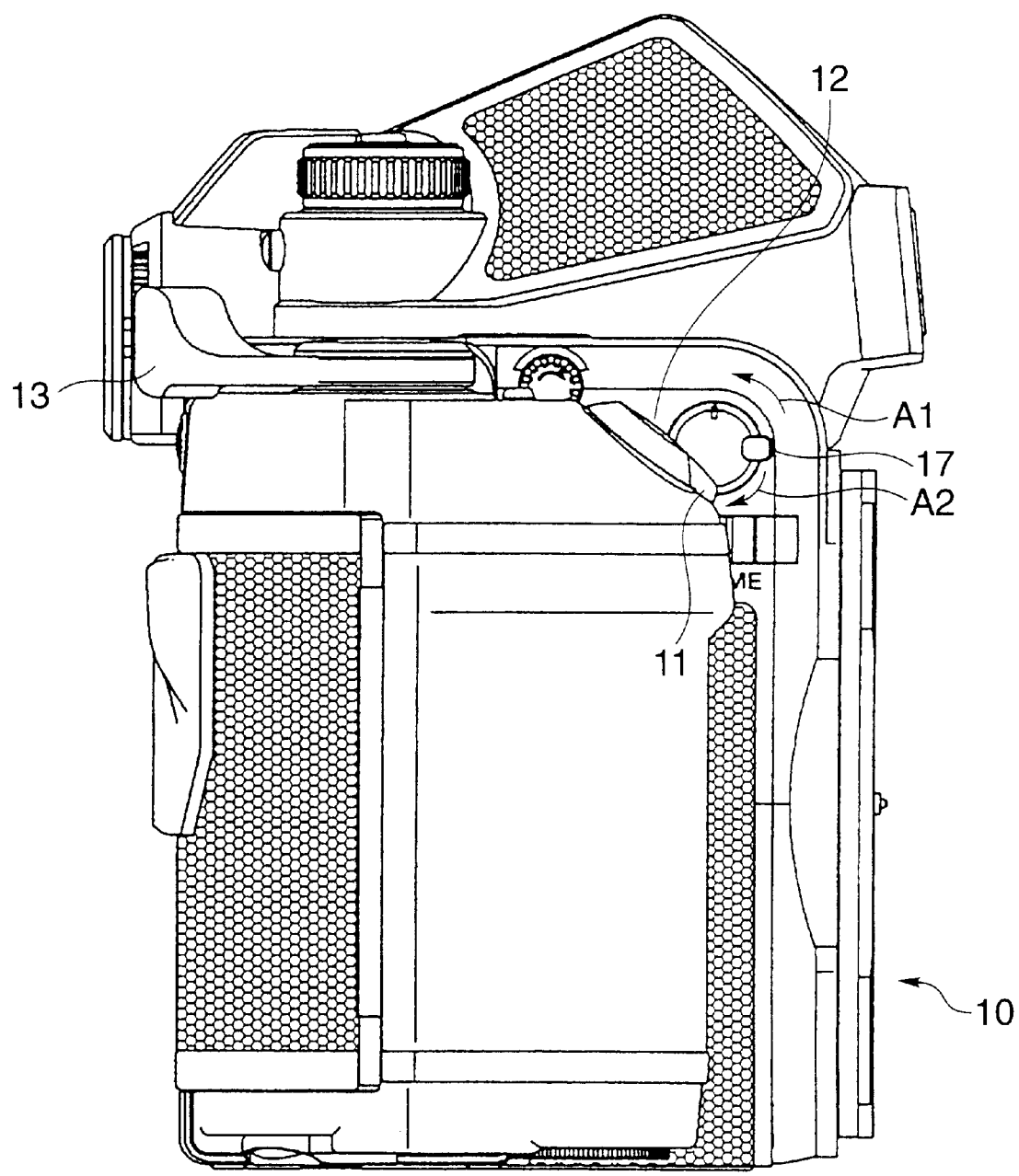
FIG. 2 is a side view of the single-lens reflex camera shown in FIG. 1.

FIG. 1 is a plan view showing a single-lens reflex camera using Blowny film. FIG. 2 is a side view of the single-lens reflex camera. In these drawings, a camera body 10, from which an interchangeable lens is removed, is shown.

An upper surface of the camera body 10 is provided with a main switch 11, a shutter button 12, a winding lever 13, a shutter speed set dial 14 and an external liquid crystal display 15. The main switch 11 is provided for turning ON and OFF an electric power supply so that the camera is activated. The shutter button 12 is depressed by the user to perform a photographing operation. The winding lever 13 is rotated by the user to wind on a film. The shutter speed set dial 14 is provided for setting a shutter speed of the photographing operation. The external liquid crystal display 15 is provided for indicating various conditions of the camera.

A lid 16 is provided on a rear side of the camera body 10 to open and close an opening formed on the rear surface. A side surface of the camera body 10 is provided with a mirror control switch 17, which will be described later.

A lid condition sensing switch 20 is provided on the camera body 10 to sense whether the lid 16 is open or closed. Angular sensing switches 21, 22 and a winding operation completion sensing switch 23 are provided on the camera body 10, to sense an angular position of the winding lever 13.

Figure 3:
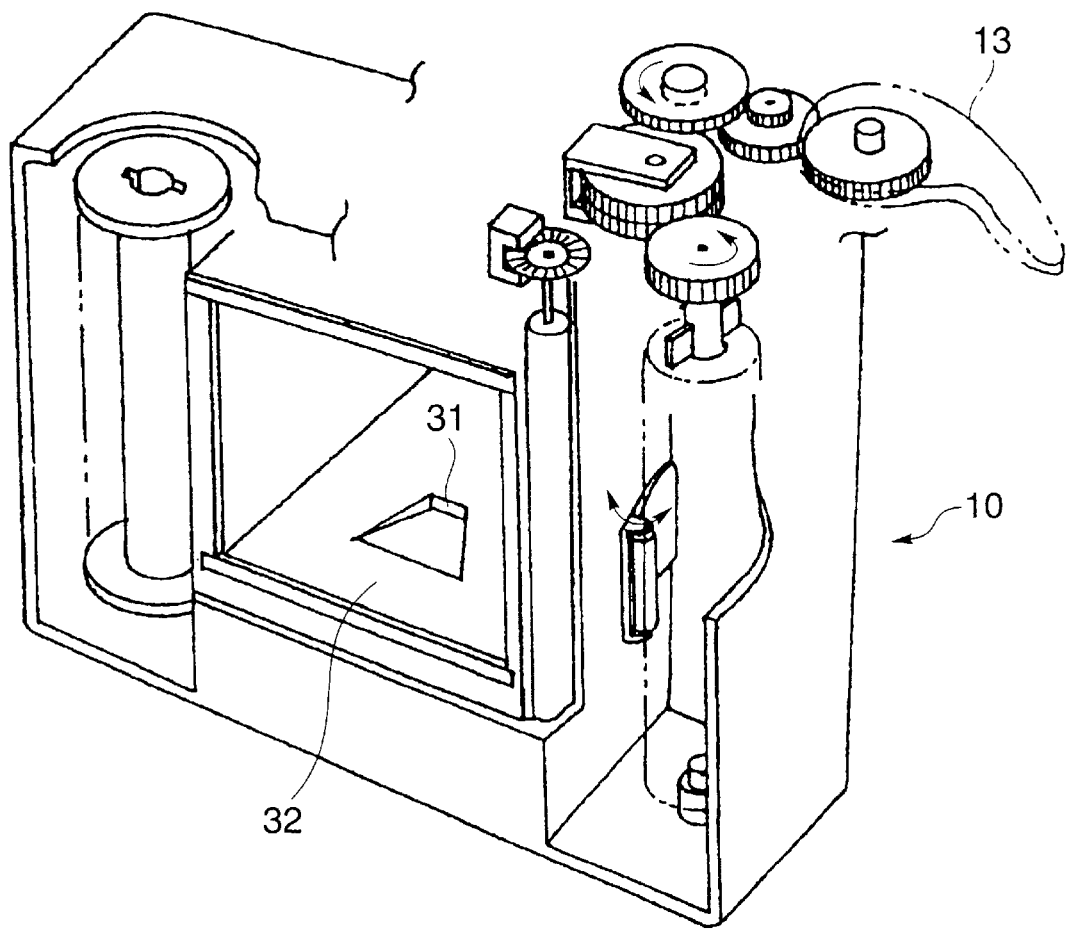
FIG. 3 is a perspective view showing a position where a photoreceptor element is provided.
Figure 4:
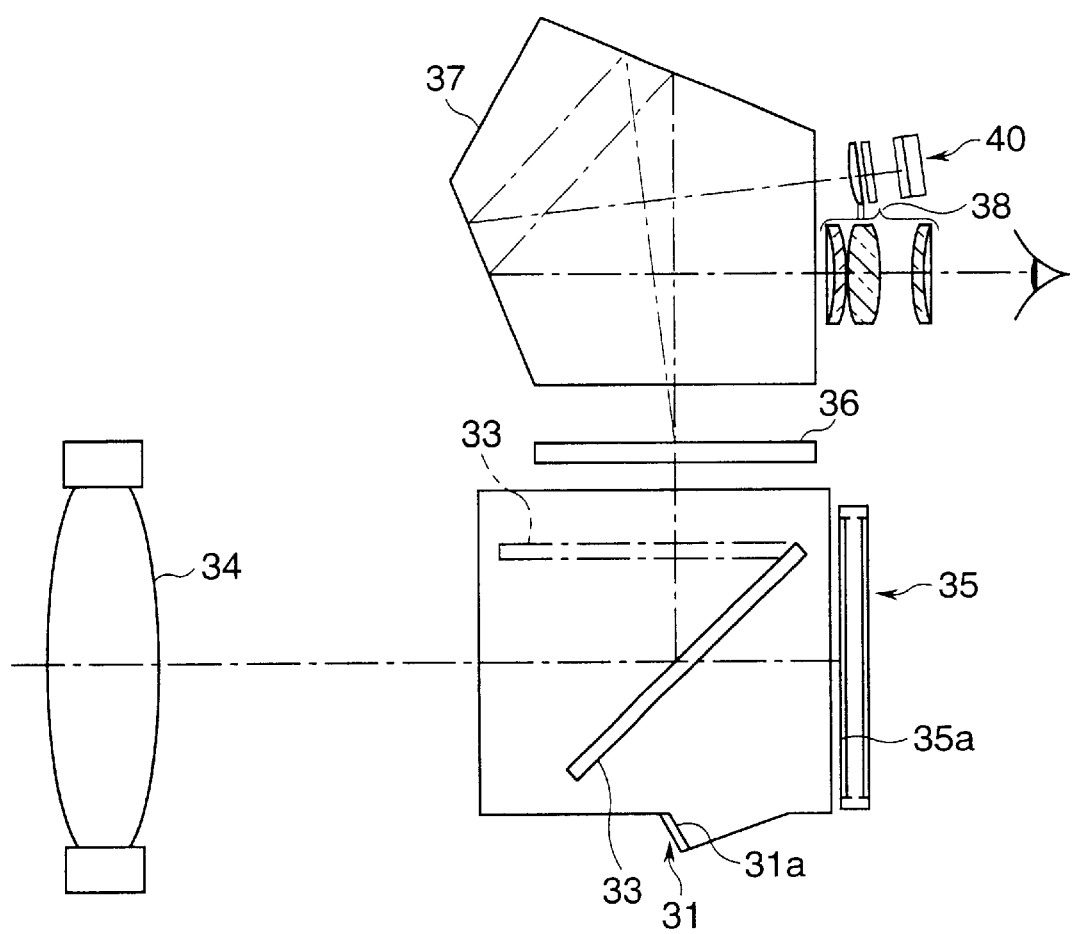
FIG. 4 is a schematic view showing an arrangement of optical components of the camera.

As shown in FIGS. 3 and 4, a photoreceptor element 31 is disposed on a bottom portion 32 formed in the camera body 10, and under a quick return mirror 33 which is provided between a photographing optical system 34 and a focal plane shutter 35. A focusing glass 36 is located above the quick return mirror 33, and a pentagonal prism 37 is disposed above the focusing glass 36. A view-finder optical system 38 is provided behind a rear surface of the pentagonal prism 37, and a photometry IC 40 is disposed behind the rear surface of the pentagonal prism 37 and above the view-finder optical system 38.

Although the photoreceptor element 31 is provided for controlling the amount of flash light as is well known, in the embodiment, the photoreceptor element 31 is also used for sensing the amount of a light beam passing through the photographing optical system 34 when the quick return mirror 33 is set to a photographing position, as will be described later. A light receiving surface 31a of the photoreceptor element 31 faces the focal plane shutter 35.

The quick return mirror 33 is rotatable between an object observing position (i.e., an inclined position) and a photographing position (i.e., a horizontal position). When the quick return mirror 33 is inclined as shown by a solid line in FIG. 4 (i.e., the object observing position), a luminous flux passing through the photographing optical system 34 is reflected by the mirror 33 and led to the view-finder optical system 38. Conversely, when the quick return mirror 33 is horizontal as shown by a chained line in FIG. 4 (i.e., the photographing position), the luminous flux is not reflected by the mirror 33, but is made incident on a leading-shutter-curtain 35a of the focal plane shutter 35.

When the quick return mirror 33 is positioned at the photographing position, the light beam, reflected by the leading-shutter-curtain 35a, enters the photoreceptor element 31. A surface of the leading-shutter-curtain 35a, which faces the photographing optical system 34, is subjected to a surface treatment to be grey and have approximately the same reflectivity as the average reflectivity of a light receiving surface of Blowny film.

The quick return mirror 33 is usually fixed at the object observing position. When the shutter button 12 is fully depressed to perform a photographing operation, a mirror drive motor 61 (FIG. 5) is driven, so that the mirror 33 is rotated or retreated to the photographing position. Then, when the photographing operation is completed, the mirror 33 is returned from the photographing position to the object observing position by the mirror drive motor 61.

Conversely, when the mirror control switch 17 is rotated in a direction shown by an arrow A1 in FIG. 2 while the quick return mirror 33 is positioned at the object observing position, the mirror drive motor 61 is driven, so that the mirror 33 is retreated to the photographing position. In this state, when the mirror control switch 17 is rotated in a direction shown by an arrow A2 in FIG. 2, the mirror drive motor 61 is driven so that the mirror 33 is compulsorily moved from the photographing position to the object observing position.

When the quick return mirror 33 is positioned at the object observing position, a part of the luminous flux entering the pentagonal prism 37 is made incident on the view-finder optical system 38, and the other part of the luminous flux is led to the photometry IC 40, so that a first photometry value of the object can be sensed. Conversely, when the quick return mirror 33 is positioned at the photographing position, since the focusing glass 36 is blocked by the quick return mirror 33, the luminous flux does not enter the photometry IC 40, and the first photometry value cannot be sensed by the photometry IC 40. Instead, a light beam, passing through the photographing optical system 34 and being reflected by the shutter 35, enters the light receiving surface 31a of the photoreceptor element 31, and thus a second photometry value is sensed by the photoreceptor element 31.

FIG. 5 shows a block diagram of electric circuits of the camera. A control unit 50 is mounted in the camera body 10. Electric power is supplied by a power supply circuit 51 to the control unit 50. An oscillator 52 is provided for outputting a clock signal to the control unit 50. An aperture associated member 53, which is moved in association with an aperture (not shown) provided in the photographing lens 34, is provided for outputting an aperture signal indicating the opening degree of the aperture. The aperture signal is transmitted to the control unit 50. A pulse signal, generated by a pulse generating circuit 54, and data, stored in an EEPROM 55 and related to a photographing operation, are input to the control unit 50.

The main switch 11, the lid condition sensing switch 20, the angular sensing switches 21, 22, the winding operation completion sensing switch 23, a photometry switch 12a, a release switch 12b, a mirror-up switch 17a, a mirror-down switch 17b, and other switches 56 are connected to the control unit 50. The photometry switch 12a is turned ON when the shutter button 12 is partly depressed. The release switch 12b is turned ON when the shutter button 12 is fully depressed. The mirror-up switch 17a is turned ON when the mirror control switch 17 is rotated in the direction of the arrow A1 (FIG. 2) so that the quick return mirror 33 is moved up to the photographing position. The mirror-down switch 17b is turned ON when the mirror control switch 17 is rotated in the direction of the arrow A2 (FIG. 2) so that the quick return mirror 17 is compulsorily moved down from the photographing position to the object observing position.

The mirror-up switch 17a is a self-return type switch, in which the mirror-up switch 17a is automatically turned OFF and the mirror control switch 17 is returned to the original horizontal position when a finger of the user is released from the mirror control switch 17. The mirror-down switch 17b is a self-return type switch similar to the mirror-up switch 17a. Namely, the mirror-down switch 17b is automatically turned OFF and the mirror control switch 17 is returned to the original horizontal position when a finger of the user is released from the mirror control switch 17.

A first photometry value Bv, obtained by the photometry IC 40 immediately before the quick return mirror 33 is moved to the photographing position, is stored in a memory circuit 62 due to an operation of the control unit 50.

Further, under the control of the control unit 50, a light emitting diode 63, provided in the view-finder, is turned ON in accordance with an operation of the camera, information is output to a view-finder liquid crystal display 64 in the view-finder to be indicated thereon, and information is input to the external liquid crystal display 15 to be indicated thereon. The control unit 50 also has a function in which, when a change in the amount of received light of the photoreceptor element 31 exceeds a predetermined range while the quick return mirror 33 is positioned at the photographing position, a warning, advising that the amount of change exceeds the predetermined range, is indicated by the view-finder liquid crystal display 64.

A shutter drive unit 65 is connected to the control unit 50, and is provided with the shutter charge mechanism (not shown) and a shutter ratch mechanism (not shown), by which a spring force is accumulated and released to perform an opening and closing operation of the shutter 35 due to the spring force. Namely, the shutter drive circuit 65 is controlled by the control unit 50 so that the shutter 35 is opened and closed.

Figure 6A:
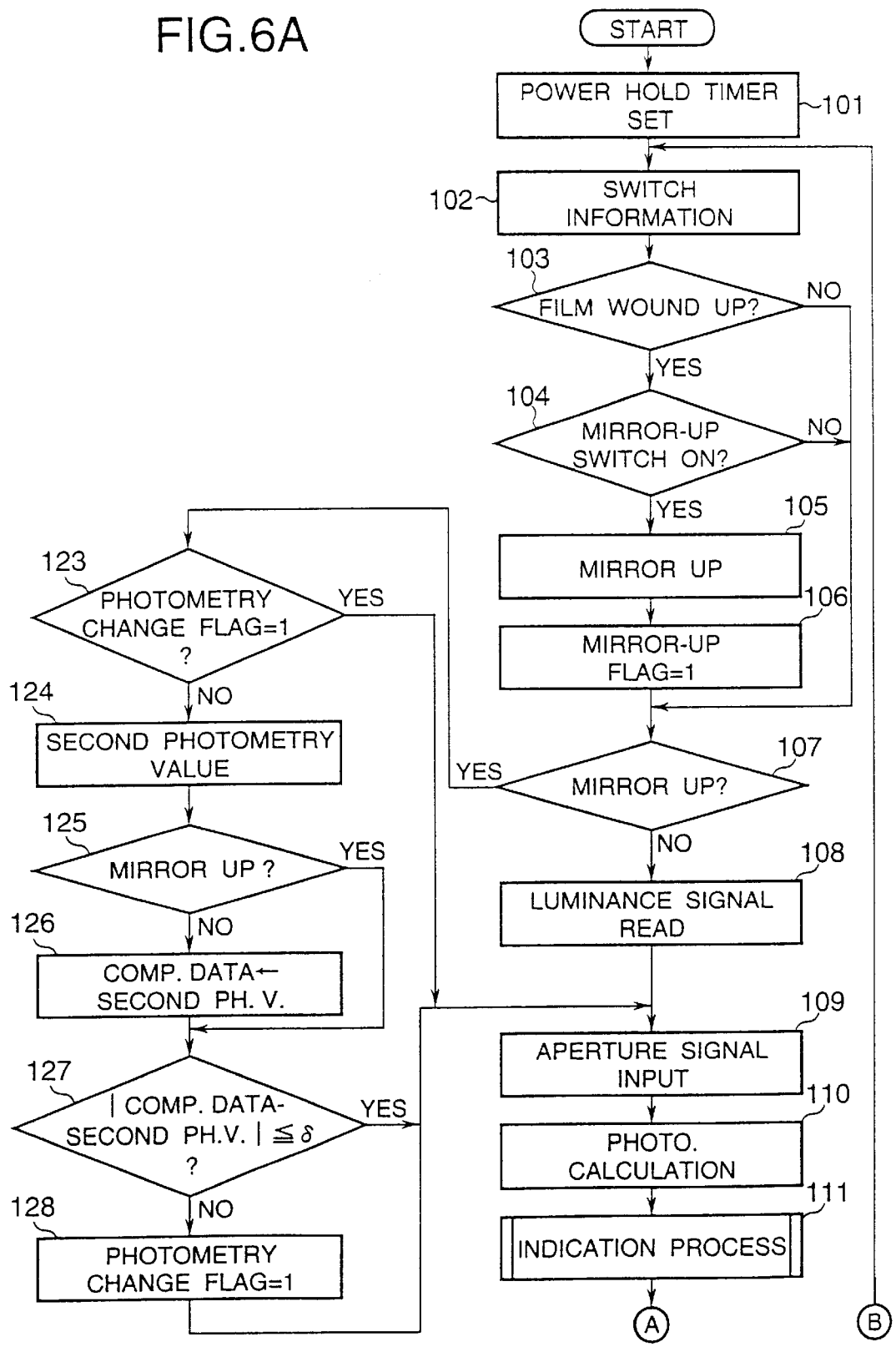

FIGS. 6A and 6B are a flowchart of a photographing operation control routine, by which a photographing operation of the camera is controlled. The control routine is a subroutine which is executed by a main program (not shown), and is executed when a film has been wound on by one frame and the photometry switch 12a is turned ON, i.e., when the shutter button 12 is partly depressed.

First, a case, in which the mirror control switch 17 is not operated, is described.

In Step 101, a power hold timer is set to "10 sec". Due to the power hold timer, when 10 seconds have been passed since the photometry switch 12a was turned ON, a sleep mode is set, in which each of the circuits of the camera halts with a minimum power supply.

In Step 102, switch information, indicating an ON-OFF condition of each of the switches, is input to the control unit 50. It is determined in Step 103 whether a winding operation of the film has been completed. When the winding operation has been completed, the process goes to Step 104, and when the winding operation has not been completed, the process goes to Step 107. Here, since the film has been wound on by one frame, Step 104 is executed, in which it is determined whether the mirror-up switch 17a is turned ON. When the mirror-up switch 17a is turned ON, Step 105 is executed, and when the mirror-up switch 17a is turned OFF, Step 107 is executed. Here, since it is supposed that the mirror-up switch 17a is turned OFF, Step 107 is executed.

In Step 107, it is determined whether the quick return mirror 33 is moved up to the photographing position. Here, since the mirror-up switch 17a is not turned ON, it is determined that the quick return mirror 33 is not moved up, and thus, the process goes to Step 108.

In Step 108, a photometry signal, output from the photometry IC 40, is read. The photometry signal is obtained by a photometry operation which is carried out by turning ON the photometry switch 12a. Based on the photometry signal, a first photometry value Bv of the object, which is to be photographed, is obtained and is stored in the memory circuit 62. Then, in Step 109, the aperture signal indicating the opening degree of the aperture is input from the aperture associated member 53, and based on the aperture signal, a photometry calculation process is performed in Step 110.

Figure 7:
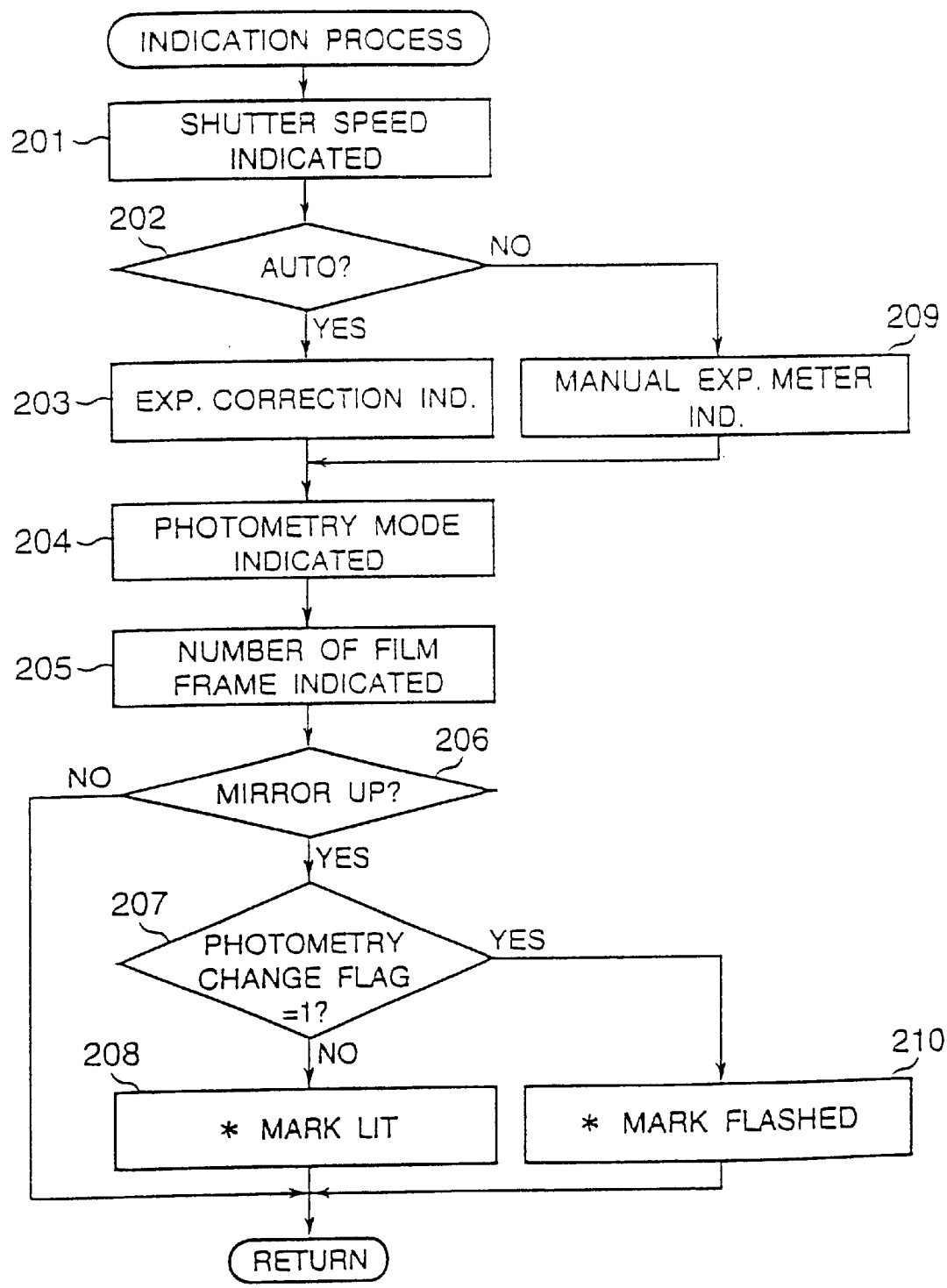
FIG. 7 is a flowchart of an indication process routine.
Figure 8:
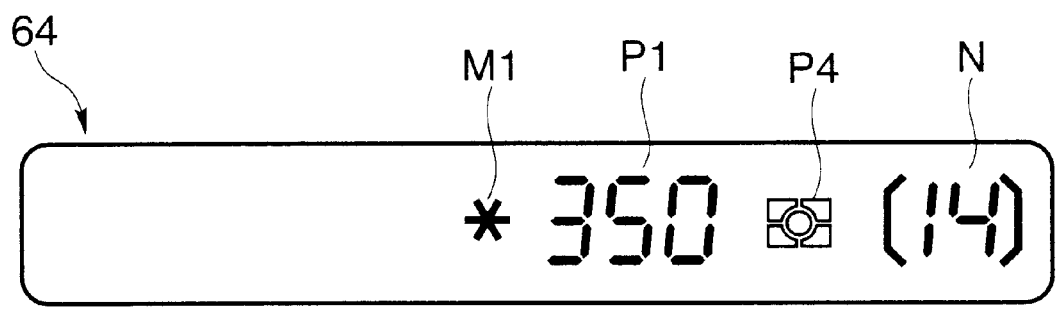
FIG. 8 is a view showing a view-finder display when a shutter speed is automatically controlled.
Figure 9:
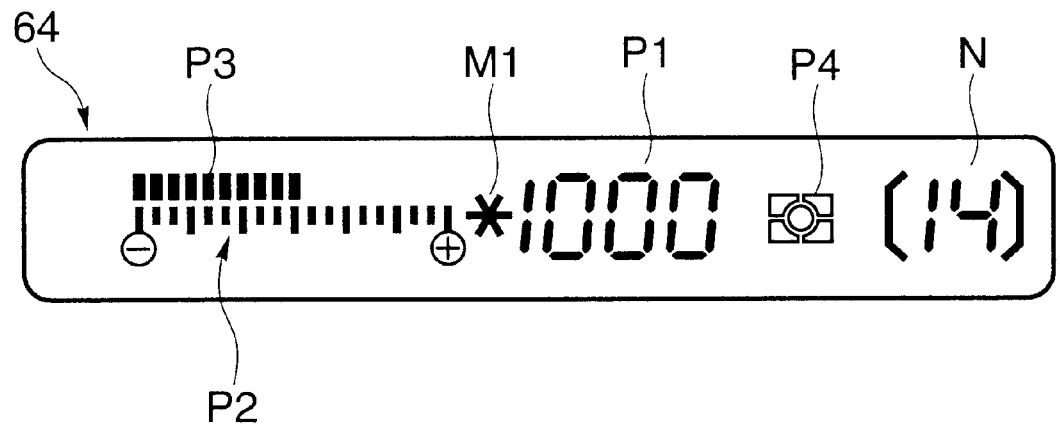
FIG. 9 is a view showing a view-finder display when a shutter speed is manually controlled.

Then, Step 111 is executed, in which an indication process routine is executed as shown in FIG. 7. In the indication process routine, first, Step 201 is executed in which a shutter speed P1 is indicated in the view-finder liquid crystal display 64 as shown in FIGS. 8 and 9. In Step 202, it is determined whether the shutter speed is automatically or manually controlled. When the shutter speed is automatically controlled, Step 203 is executed, and when the shutter speed is manually controlled, Step 209 is executed. In Step 203, an exposure correction indicating process is executed, in which information, relating to the exposure, is not indicated in the view-finder liquid crystal display 64 as shown in FIG. 8. Conversely, in Step 209, a manual exposure meter P2 is indicated in the view-finder liquid crystal display 64 as shown in FIG. 9, so that, based on the first photometry value Bv stored in the memory circuit 62, an over-exposure or under-exposure, relative to a proper exposure value, is indicated by a bar graph P3.

In Step 204, it is indicated which photometry mode is selected, namely, either a divided brightness measuring, a center-weighted measuring or a spot metering. The photometry mode is selected by operating a photometry mode switching lever (not shown), and in this example, a mark P4, implying that the divided brightness measuring is selected, is indicated in the view-finder liquid crystal display 64.

In Step 205, as shown in FIGS. 8 and 9, a numeral N signifying the number of the film frame is indicated in the view-finder liquid crystal display 64. In Step 206, it is determined whether the quick return mirror 33 is moved up to the photographing position. When the quick return mirror 33 is positioned at the photographing position, Step 207 is executed, and when the quick return mirror 33 is not positioned at the photographing position, the indication process routine ends. Here, since the mirror-up switch 17a is not turned ON, the indication process routine ends, and returns to Step 112 of the photographing operation control routine.

In Step 112, it is determined whether the mirror-down switch 17b is turned ON. When the mirror-down switch 17b is turned OFF, Step 116 is executed, and when the mirror-down switch 17b is turned ON, Step 113 is executed. In Step 113, it is determined whether a mirror-up flag is set to 1. When the mirror-up flag is set to 1, Step 114 is executed, and when the mirror-up flag is set to 0, Step 116 is executed. In Step 114, the quick return mirror 33 is moved down to the object observing position, and in Step 115, the mirror-up flag is cleared to 0.

Here, since the mirror-down switch 17b is not operated, it is determined in Step 112 that the mirror-down switch 17b is not turned ON, and thus, the process goes to Step 116.

In Step 116, it is determined whether the film has been wound on by one frame. When the film has been wound on, Step 117 is executed, and when the film has not been wound on, Step 121 is executed. Here, since the film has been wound on, Step 117 is executed, in which it is determined whether the release switch 12b is turned ON. When the release switch 12b has not been turned ON, Step 121 is executed, and when the release switch 12b has been turned ON, Step 118 is executed. Here, since the release switch 12b has not been turned ON, Step 121 is executed.

In Step 121, 1 is subtracted from the value of the power hold timer, and in Step 122, it is determined whether the value of the power hold timer has become 0.

The process composed of Steps 102 through 122 is repeatedly carried out until the value of the power hold timer becomes 0. Thus, when the value of the power hold timer is 0, the photographing operation control routine ends and returns to the main routine in which the control routine is executed.

Next, a case, in which the mirror-up switch 17a is turned ON, is described below.

By turning ON the mirror-up switch 17a, the process goes from Step 104 to Step 105, in which the quick return mirror 33 is moved up to the photographing position. Then, in Step 106, the mirror-up flag is set to 1. In Step 107, it is determined whether the quick return mirror 33 is moved up to the photographing position. Since the quick return mirror 33 has been moved up, Step 123 is executed.

In Step 123, it is determined whether a photometry change flag is set to 1. Since the photometry change flag is not set to 1, Step 124 is executed in which a second photometry value, obtained by the photoreceptor element 31, is read.

In Step 125, it is determined whether the quick return mirror 33 was moved up to the photographing position in the previous execution of Step 125. When the quick return mirror 33 was moved up, the process goes to Step 127, and when the quick return mirror 33 was not moved up, implying that the quick return mirror 33 has just before been moved up, the process goes to Step 126, in which the second photometry value obtained in Step 124 is stored in the memory circuit 62 as a comparison data.

In Step 127, it is determined whether an absolute value of the difference between the comparison data and the second photometry value is less than or equal to a predetermined value δ. Here, since the comparison data is the same as the second photometry value, Steps 109, 110 and 111 are executed.

In Step 111, the indication process routine is executed, in which Steps 201, 202, 203 (or 209), 204 and 205 are executed in this order, and then Step 206 is executed. In Step 206, it is determined that the quick return mirror 33 is moved up, so that the process goes to Step 207, in which it is determined that the photometry change flag is not set to 1. Thus, Step 208 is executed, in which a mark M1 of "*" is lit in the view-finder liquid crystal display 64, and the process goes back to Step 112 of the photographing operation control routine. The mark M1 signifies that the first photometry value, which was obtained immediately before the quick return mirror 33 was retreated to the photographing position, is stored by the memory circuit 62, and that the quick return mirror 33 is retreated to the photographing position.

Thus, since the single mark M1 signifies the two meanings, the view-finder liquid crystal display 64 can be miniaturized.

In Step 112, it is determined whether the mirror-down switch 17b is turned ON. When the mirror-down switch 17b is turned OFF, the process goes to Step 116, and when the mirror-down switch 17b is turned ON, the process goes to Step 113, in which it is determined whether the mirror-up flag is set to 1, i.e. it is determined whether the quick return mirror 33 is moved up to the photographing position. When the mirror-up flag is set to 1, Step 114 is executed in which the quick return mirror 33 is moved down to the object observing position, Step 115 is executed in which the mirror-up flag is reset to 0, and Step 116 is then executed. Conversely, when it is determined in Step 113 that the mirror-up flag is set to 0, the process goes to Step 116.

Thus, when the mirror-down switch 17b is turned ON, if the quick return mirror 33 is positioned at the photographing position, the quick return mirror 33 is moved down to the object observing position and the mirror-up flag is reset to 0. Conversely, if the quick return mirror 33 is not positioned at the photographing position, the process goes from Step 113 to Step 116.

Namely, due to the execution of the indication process routine of Step 111, the mark M1 is lit, so that the user can verify that the quick return mirror 33 is positioned at the photographing position. Then, the user can operate the mirror-down switch 17b to release the mirror-up condition so that the quick return mirror 33 is compulsorily moved from the photographing position to the object observing position. Thus, a photometry operation by the photometry IC 40 becomes possible, so that a flawed photographing operation, using the improper exposure conditions with the mirror 33 in the photographing position, is prevented.

In Step 116, it is determined whether the film has been wound on by one frame. When the winding operation has been completed, Step 117 is executed in which it is determined whether the release switch 12b is turned ON. When the release switch 12b is turned ON, the process goes to Step 118 in which a shutter release operation is performed to open and close the shutter 35.

On the other hand, when it is determined in Step 116 that the winding operation has been completed, and when it is determined in Step 117 that the release switch 12b is not turned ON, the process goes to Step 121.

In the next execution of the photographing operation control routine, Steps 102 through 107, Steps 123, 124 and 125 are executed. In Step 125, it is determined whether, in the previous execution of Step 125, the quick return mirror 33 was positioned at the photographing position. Since the quick return mirror 33 was positioned at the photographing position in the previous execution of Step 125, the process goes to Step 127.

In Step 127, it is determined whether an absolute value of the difference between the comparison data stored in the memory circuit 62 and the second photometry value obtained in Step 124 is less than or equal to the predetermined value δ. When the absolute value is less than or equal to the predetermined value δ, Step 109 is executed, and when the absolute value is greater than the predetermined value δ, Step 128 is executed. Thus, when the luminance of the object is significantly changed, since the absolute value of the difference between the comparison data and the second photometry value becomes greater than the predetermined value δ, the process goes to Step 128. Namely, in Steps 124 through 128, while the quick return mirror 33 is positioned at the photographing position, a light beam passing through the photographing optical system is monitored by the photoreceptor element 31 and it is determined whether the amount of the light beam has significantly changed.

When it is determined in Step 127 that the absolute value is less than or equal to the predetermined value δ, Step 109 is executed without executing Step 108. Therefore, when the quick return mirror 33 is positioned at the photographing position, photometry information is not output from the photometry IC 40 to which a luminous flux is not led, and the first photometry value Bv, which was obtained immediately before the quick return mirror 33 was moved up to the photographing position, is stored in the memory circuit 62.

In Step 128, the photometry change flag is set to 1. Then, the process goes to Step 109, and Steps 110 and 111 are then executed.

Namely, Steps 201, 202, 203 (or 209), 204, 205 and 206 are executed, and Step 207 is then executed. In Step 207, it is determined whether the photometry change flag is set to 1. When the photometry change flag is 1, i.e. when the luminance of the object has significantly changed, Step 210 is executed, in which the mark M1 of "*" is flashed in the view-finder liquid crystal display 64, and the process goes back to Step 112 of the photographing operation control routine.

Thus, when the absolute value of the difference between the object luminance, immediately before the quick return mirror 33 was moved up, and the object luminance, after the quick return mirror 33 was moved up, is greater than the predetermined value, i.e., the object luminance has significantly changed, the mark M1 of "*" is flashed in the view-finder liquid crystal display 64. Therefore, since it is recognized by the user that the object luminance has been significantly changed, in spite of the quick return mirror 33 being positioned at the photographing position, the user can move down the quick return mirror 33 so that a photometry operation is performed again. Accordingly, an over-exposure and an under-exposure because of the change of the object luminance are prevented, and thus an improper photographing operation is surely prevented.

The process goes from the indication process routine to the photographing operation control operation, and Steps 112 through 116 are executed. Then, Steps 117, 121 and 122 are executed, and when the power hold timer is 0, the photographing operation control routine ends and returns to the main routine.

When the release switch 12b is turned ON, Steps 101 through 107, Steps 123 through 128, and Steps 109 through 116 are executed. Then, in Step 117, it is determined that the release switch 12b is turned ON, and thus Step 118 is executed, in which the shutter release operation is performed to carry out a photographing operation.

It is supposed that it is determined in Step 127 that the absolute value of the difference is less than or equal to the predetermined value δ, so that the process goes to Step 109 without executing Step 108, and Steps 110 through 118 are executed to carry out a photographing operation. In this case, the photographing operation is performed based on the first photometry value Bv obtained immediately before the quick return mirror 33 was moved up. Namely, after the quick return mirror 33 was moved up to the photographing position, if the change in the photometry value is less than or equal to the predetermined value, a proper photographing operation is carried out despite being in a state in which the quick return mirror 33 is moved up.

In Step 119, the mirror-up flag and the photometry change flag are reset to 0, respectively. In Step 120, a wind lock mechanism is released so that the film becomes able to be wound on. Then, Steps 121 and 122 are executed, and when the power hold timer becomes 0, the photographing operation control routine ends and returns to the main routine.

Note that the mark M1, signifying that the first photometry value is stored in the memory circuit 62, that the quick return mirror 33 is retreated to the photographing position, and that the object luminance has significantly changed, can be indicated by the external LCD 15.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-330581 (filed on Nov. 20, 1998) which is expressly incorporated herein, by reference, in its entirety.

What is claimed is:

1. A single-lens reflex camera comprising:

a mirror movable between an object observing position, at which a luminous flux passing through a photographing optical system is reflected by a mirror and led to a view-finder optical system, and a photographing position, at which said luminous flux is not reflected by said mirror;

a photoreceptor element having a light receiving surface which faces a shutter, so that a light beam, passing through said photographing optical system and reflected by said shutter, enters said light receiving surface;

a mirror retract mechanism that retracts said mirror to said photographing position before a shutter release operation in which said shutter opens and closes; and a warning processor that outputs a warning when a change in the amount of light received by said photoreceptor element exceeds a predetermined range while said mirror is retracted to said photographing position before said shutter release operation, said warning signifying that said change exceeds said predetermined range.

2. A single-lens reflex camera according to claim 1, further comprising:

a photometry element provided in an optical path of said view-finder optical system such that said luminous flux, which is reflected by said mirror at said object observing position, is directed to said photometry element; and a photometry value storing processor that stores a photometry value of an object to be photographed, said photometry value being obtained by said photometry element before said mirror is retracted by said mirror retract mechanism.

3. A single-lens reflex camera according to claim 1, wherein said warning processor comprises a display, which indicates a first condition mark signifying that said mirror is retracted to said photographing position.

4. A single-lens reflex camera according to claim 3, wherein said display is provided in said view-finder optical system.

5. A single-lens reflex camera according to claim 3, wherein said display comprises a liquid crystal display provided on a camera body of said single-lens reflex camera.

6. A single lens reflex camera according to claim 3, further comprising:

a photometry element provided in an optical path of said view-finder optical system such that said luminous flux, which is reflected by said mirror at said object observing position, is directed to said photometry element; and a photometry value storing processor that stores a photometry value of an object to be photographed, said photometry value being obtained by said photometry element before said mirror is retracted by said mirror retract mechanism, said first condition mark signifying that said photometry value is stored.

7. A single-lens reflex camera according to claim 3, wherein said display indicates a second condition mark signifying that said change exceeds said predetermined range after said mirror is retracted by said mirror retract mechanism.

8. A single-lens reflex camera according to claim 7, further comprising a comparing processor that repeatedly checks said change.

9. A single-lens reflex camera according to claim 7, wherein said first condition mark is a predetermined mark that is lit, and said second condition mark is said predetermined mark that is flashed.

10. A single-lens reflex camera according to claim 1, further comprising a mirror control switch for compulsorily moving said mirror from said photographing position when said mirror is retracted to said photographing position.

* * * * *